Patented Oct. 18, 1949

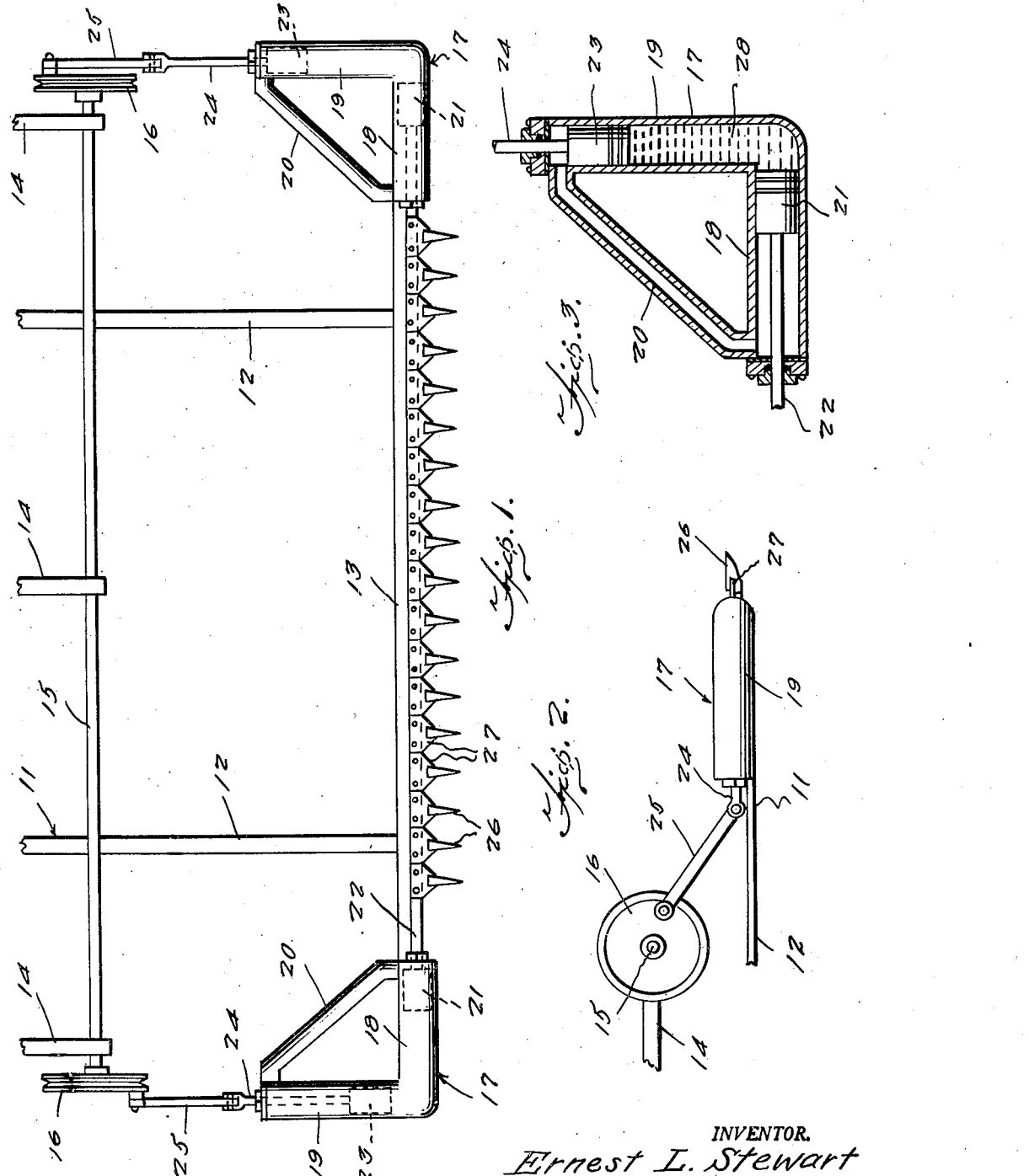

2,484,861

UNITED STATES PATENT OFFICE 2,484,861

FLUID PRESSURE SICKLE DRIVE FOR HARVESTERS

Ernest L. Stewart, North Salem, Ind.

Application December 9, 1947, Serial No. 790,620

3 Claims. (Cl. 56—25)

This invention relates to harvesters, and more particularly to an improved means for oscillating the sickle blade of a harvester.

A main object of the invention is to provide a novel and improved mechanism for oscillating the sickle blade of a harvester, said mechanism being very simple in construction, being very smooth in performance and being relatively light in weight, whereby excessive force is not required to reverse the direction of movement of the sickle blade during its oscillatory action.

A further object of the invention is to provide an improved drive mechanism for oscillating a harvester sickle blade, said mechanism transmitting force to the sickle blade through a liquid column, thereby providing a smooth, driving action which is substantially free of shock, the mechanism being composed of inexpensive parts and being adapted to operate for long periods of time without requiring repair or renewal of said parts.

Further objects and advantages of the invention will become apparent from the following description and claims, and from the accompanying drawings, wherein:

Figure 1 is a top plan view of a sickle and drive mechanism therefor constructed in accordance with the present invention, shown attached to the frame of a harvester.

Figure 2 is a side elevational view of the structure illustrated in Figure 1.

Figure 3 is an enlarged horizontal cross sectional detail view taken on line 3—3 of Figure 2.

Referring to the drawings, 11 designates the frame of a harvester, said frame being conventional in construction and including parallel longitudinal members 12, 12 connected at their forward ends by a transverse member 13.

Secured to the harvester frame by suitable means, not shown, are a plurality of longitudinally extending supports 14. Journaled in the ends of said supports is a transverse shaft 15 carrying at its ends crank pulleys 16, 16. Pulleys 16, 16 are coupled to the harvester prime mover by suitable belts, not shown.

Rigidly secured to the ends of transverse member 13 are respective right-angled cylinder blocks 17, 17, each block 17 comprising a transversely extending cylinder portion 18 and a longitudinally extending cylinder portion 19 communicating with the transverse portion 18 at the right-angled bend. The ends of the transverse and longitudinal cylinder portions are connected by diagonal conduit elements 20. Slidable in each transverse cylinder portion 18 is a piston 21.

The pistons 21, 21 are connected together by a transverse rod 22. Slidable in each longitudinal cylinder portion 19 is a piston 23 provided with a rearwardly extending piston rod 24 passing slidably through the rear wall of the longitudinal cylinder portion. A connecting rod 25 is pivotally connected at one end to the end of each rod 24 and is pivotally connected at its other end to an associated crank pulley 16. The points of connection of the connecting rods 25, 25 to the respective pulleys 16, 16 are separated by 180 degrees with respect to the pulley shaft 15, so that the pistons 23, 23 move in opposite directions responsive to rotation of said shaft.

The space in each right-angled cylinder block 17 between the pistons 21 and 23 is filled with a suitable liquid, such as oil, shown at 28.

Secured to transverse rod 22 are the spaced sickle teeth 26, projecting forwardly from transverse member 13 and the spaced stationary sickle teeth 27 with which the sickle teeth 26 cooperate to produce cutting action when the rod 22 is reciprocated transversely.

In operation, pistons 23, 23 are reciprocated by their connecting rods 24, 24 in opposite directions, as above explained, responsive to the rotation of the pulleys 16, 16 by their driving belts. When each piston 23 is moved forwardly it transmits force to its associated piston 21 through the oil 28 in the cylinder block. At the same time, air pressure is developed in the conduit 20 at the opposite cylinder block by the rearwardly moving piston 23 therein, said air pressure acting on the piston 21 in said opposite cylinder block to aid the force transmitted to the piston 21 in the first cylinder block in moving the rod 22 in a first transverse direction. When the movement of the pistons 23, 23 is reversed, the direction of the resultant force applied to rod 22 is also reversed, causing said rod 22 to move in the opposite transverse direction. The sickle teeth 26 are thereby reciprocated back and forth with respect to the stationary teeth 27, thus providing the desired cutting action.

The piston rods 22 and 24 are sealed at the end walls of the respective cylinder portions by suitable packing glands.

While a specific embodiment of a fluid pressure operated actuating mechanism for a harvester sickle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a harvester, a transverse support secured to the harvester frame and carrying spaced longitudinally directed teeth thereon, a cylinder block secured to each end of the support, each block comprising a transversely extending cylinder portion and an additional communicating cylinder portion, pistons in the transversely extending cylinder portions, a rod connecting said pistons and carrying spaced sickle teeth extending adjacent the teeth carried by said support, pistons in the additional cylinder portions, and means for simultaneously reciprocating said latter pistons in opposite directions.

2. In a harvester, transverse support means carrying spaced longitudinally directed teeth, a cylinder block secured to each end of said support means, each block comprising a transversely directed cylinder portion and an additional cylinder portion communicating with the transversely directed cylinder portion, pistons in the transversely directed cylinder portions, a rod connecting said pistons and carrying spaced sickle teeth extending adjacent the teeth carried by said support means, pistons in the additional cylinder portions, means for simultaneously reciprocating said latter pistons in opposite directions, and conduit means carried by each cylinder block and connecting the ends of the cylinder portions thereof.

3. In a harvester, transverse support means carrying spaced longitudinally directed teeth, a cylinder block secured to each end of said support means, each block comprising a transversely directed cylinder portion and a communicating longitudinally directed cylinder portion, pistons in the transversely directed cylinder portion, a rod connecting said pistons and carrying spaced sickle teeth extending adjacent the teeth carried by said support means, pistons in the longitudinally directed cylinder portions, a shaft journaled transversely on the harvester frame, a pair of crank discs carried by said shaft, link means connecting each crank disc with one of said latter pistons, the respective link means being connected to the respective crank discs at an angular spacing of 180 degrees with respect to said shaft whereby the said latter pistons reciprocate simultaneously but in opposite directions as the shaft rotates, and conduit means carried by each cylinder block and connecting the ends of the cylinder portions thereof.

ERNEST L. STEWART.

REFERENCES CITED

The following references are of record in the file of this patent:

UNITED STATES PATENTS

| Number | Name | Date |
|---|---|---|
| 796,268 | Troeger | Aug. 1, 1905 |
| 1,200,983 | Quesnell | Oct. 10, 1916 |
| 2,332,561 | Drott | Oct. 26, 1943 |